(12) United States Patent
Wang et al.

(10) Patent No.: US 10,839,555 B2
(45) Date of Patent: Nov. 17, 2020

(54) TARGET DETECTION METHOD AND UNMANNED AERIAL VEHICLE

(71) Applicant: AUTEL ROBOTICS CO., LTD., Guangdong (CN)

(72) Inventors: Xu Wang, Guangdong (CN); Xipeng Cui, Guangdong (CN); Yu Song, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 137 days.

(21) Appl. No.: 15/986,250

(22) Filed: May 22, 2018

(65) Prior Publication Data

US 2019/0221002 A1 Jul. 18, 2019

Related U.S. Application Data

(63) Continuation of application No. PCT/CN2018/073272, filed on Jan. 18, 2018.

(51) Int. Cl.
*H04N 7/00* (2011.01)
*G06T 7/73* (2017.01)
(Continued)

(52) U.S. Cl.
CPC .............. *G06T 7/75* (2017.01); *G06K 9/0063* (2013.01); *G06K 9/4642* (2013.01);
(Continued)

(58) Field of Classification Search
CPC .. G06K 9/0063; G06K 9/4642; G06K 9/4652; G06K 9/6212; G06T 7/246; G06T 7/73; G06T 7/75; G06T 2207/10032
See application file for complete search history.

(56) References Cited

U.S. PATENT DOCUMENTS

2007/0268364 A1* 11/2007 Neff .................... G06T 7/215
348/143
2015/0032394 A1 1/2015 Kimura et al.
(Continued)

FOREIGN PATENT DOCUMENTS

CN 104574384 A 4/2015
CN 105957107 A 9/2016
(Continued)

OTHER PUBLICATIONS

Krishneel Chaudhary et al; "Robust real-time visual tracking using dual-frame deep comparision network integrated with corelation filters", 2017 IEEE/RSJ International Conference on Intelligent Robots and Systems, Sep. 24-28, 2017.
(Continued)

*Primary Examiner* — Peet Dhillon (57) ABSTRACT

The present invention provides a target detection method and an unmanned aerial vehicle. The method includes: obtaining an image of a target, and obtaining a feature model of the target according to the image of the target; determining whether the target is lost; and if it is determined that the target is lost: obtaining a currently photographed first frame of image; obtaining an $N^{th}$ frame of image which is photographed after the first frame of image, N being an integer greater than 0; obtaining, according to the first frame of image and the $N^{th}$ frame of image, a candidate area which possibly includes the target; and determining, according to the feature model of the target and the candidate area, whether the $N^{th}$ frame of image includes the target. A detection efficiency is high by using the target detection method provided in the present invention.

12 Claims, 6 Drawing Sheets

(51) Int. Cl.
*G06K 9/62* (2006.01)
*G06K 9/46* (2006.01)
*G06K 9/00* (2006.01)
*G06T 7/246* (2017.01)

(52) U.S. Cl.
CPC ......... *G06K 9/4652* (2013.01); *G06K 9/6212* (2013.01); *G06T 7/246* (2017.01); *G06T 7/73* (2017.01); *G06T 2207/10032* (2013.01)

(56) References Cited

U.S. PATENT DOCUMENTS

| | | | |
|---|---|---|---|
| 2015/0362917 A1* | 12/2015 | Wang | G05D 1/0022 701/2 |
| 2017/0030976 A1 | 2/2017 | Suzuki et al. | |
| 2019/0065859 A1* | 2/2019 | Togashi | G06K 9/00771 |
| 2019/0114501 A1* | 4/2019 | Kuo | G06T 7/248 |

FOREIGN PATENT DOCUMENTS

| | | | |
|---|---|---|---|
| CN | 105957109 A | | 9/2016 |
| CN | 106651913 A | * | 5/2017 |
| CN | 106875415 A | | 6/2017 |
| CN | 106875419 A | | 6/2017 |
| KR | 20160097873 A | | 8/2016 |

OTHER PUBLICATIONS

H. Cheng, et al; "An Autonomous Vision-Based Target Tracking System for Rotorcraft Unmanned Aerial Vehicles", 2017 IEEE/RSJ International Conference on Intelligent Robots and Systems, Sep. 24-28, 2017.

Supplementary European Search Report dated Aug. 2, 2019; EP18725381.

* cited by examiner

TARGET DETECTION METHOD AND UNMANNED AERIAL VEHICLE

CROSS REFERENCE

This application is a continuation of International Application No. PCT/CN2018/073272, filed on Jan. 18, 2018, the disclosure of which is hereby incorporated by reference in its entirety.

TECHNICAL FIELD

The present invention relates to the technical field of unmanned aerial vehicles, and in particular, to a target detection method and an unmanned aerial vehicle.

RELATED ART

Unmanned aerial vehicles (UAVs), also referred to as unmanned aerial vehicles, are unmanned aircrafts which are manipulated by using radio remote control devices and built-in program control devices. When tracking a target, the unmanned aerial vehicle may lose the target due to an obstruction. In this case, the unmanned aerial vehicle needs to perform detection again to find back the target. This process may also be referred to as a target re-detection process.

An existing target detection method is a vision-based method for finding back the target by using correlations and the like. This detection manner has a relatively slow speed and relatively low accuracy.

SUMMARY

The present invention provides a target detection method and an unmanned aerial vehicle, so as to resolve the problem in the prior art of low efficiency of finding back a target after the target is lost.

According to a first aspect, the present invention provides a target detection method which is applied to an unmanned aerial vehicle, the method including:

obtaining an image of a target, and obtaining a feature model of the target according to the image of the target;

determining whether the target is lost; and if it is determined that the target is lost:

obtaining a currently photographed first frame of image;

obtaining an $N^{th}$ frame of image which is photographed after the first frame of image, N being an integer greater than 0;

obtaining, according to the first frame of image and the $N^{th}$ frame of image, a candidate area which possibly includes the target; and determining, according to the feature model of the target and the candidate area, whether the $N^{th}$ frame of image includes the target.

In some embodiments, the feature model of the target includes global feature information and color feature information of the target.

In some embodiments, the global feature information includes a histogram of oriented gradient (HOG) of the target.

In some embodiments, the color feature information includes a color histogram of the target.

In some embodiments, the determining whether the target is lost includes:

obtaining a current frame of photographed image;

determining, according to the feature model of the target, whether the current frame of photographed image has an area matching the feature model; and if not, determining that the target is lost.

In some embodiments, the determining, according to the feature model of the target, whether the photographed image has the area matching the feature model includes:

determining a first correlation value corresponding to each area in the current frame of photographed image;

determining the area corresponding to the largest one of the first correlation values as a related area;

obtaining a feature model of the related area;

determining whether the feature model of the target is consistent with the feature model of the related area; and determining that the target is lost if the feature model of the target is inconsistent with the feature model of the related area.

In some embodiments, the obtaining, according to the first frame of image and the $N^{th}$ frame of image, the candidate area which possibly includes the target includes:

obtaining a color feature graph of the first frame of image;

obtaining a color feature graph of the $N^{th}$ frame of image; and comparing the color feature graph of the first frame of image with the color feature graph of the $N^{th}$ frame of image, and if an area having a difference which meets a preset condition exists between the color feature graph of the first frame of image and the color feature graph of the $N^{th}$ frame of image, using the area having the difference which meets the preset condition as the candidate area.

In some embodiments, the determining, according to the feature model of the target and the candidate area, whether the $N^{th}$ frame of image includes the target includes:

obtaining a feature model of the candidate area;

determining whether the feature model of the target is consistent with the feature model of the candidate area; and if yes, determining that the $N^{th}$ frame of image includes the target.

In some embodiments, the method further includes:

controlling the unmanned aerial vehicle to hover before the obtaining a currently photographed first frame of image.

In some embodiments, the obtaining the $N^{th}$ frame of image which is photographed after the first frame of image includes:

controlling the unmanned aerial vehicle to rotate about or move along a Z axis to obtain the $N^{th}$ frame of image which is photographed after the first frame of image.

According to a second aspect, the present invention provides a target detection device which is applied to an unmanned aerial vehicle, the device including:

an obtaining module, configured to obtain an image of a target, and obtain a feature model of the target according to the image of the target; and a determining module, configured to determine whether the target is lost, where the obtaining module is further configured to:

if it is determined that the target is lost, obtain a currently photographed first frame of image;

obtain an $N^{th}$ frame of image which is photographed after the first frame of image, N being an integer greater than 0; and obtain, according to the first frame of image and the $N^{th}$ frame of image, a candidate area which possibly includes the target; and the determining module is further configured to determine, according to the feature model of the target and the candidate area, whether the $N^{th}$ frame of image includes the target.

In some embodiments, the feature model of the target includes global feature information and color feature information of the target.

In some embodiments, the global feature information includes an HOG of the target.

In some embodiments, the color feature information includes a color histogram of the target.

In some embodiments, the determining module is specifically configured to: obtain a current frame of photographed image; determine, according to the feature model of the target, whether the current frame of photographed image has an area matching the feature model; and if not, determine that the target is lost.

In some embodiments, the determining module is specifically configured to:

determine a first correlation value corresponding to each area in the current frame of photographed image;

determine the area corresponding to the largest one of the first correlation values as a related area;

obtain a feature model of the related area;

determine whether the feature model of the target is consistent with the feature model of the related area; and determine that the target is lost if the feature model of the target is inconsistent with the feature model of the related area.

In some embodiments, the obtaining module is specifically configured to:

obtain a color feature graph of the first frame of image;

obtain a color feature graph of the $N^{th}$ frame of image; and compare the color feature graph of the first frame of image with the color feature graph of the $N^{th}$ frame of image, and if an area having a difference which meets a preset condition exists between the color feature graph of the first frame of image and the color feature graph of the $N^{th}$ frame of image, use the area having the difference which meets the preset condition as the candidate area.

In some embodiments, the determining module is specifically configured to:

obtain a feature model of the candidate area;

determine whether the feature model of the target is consistent with the feature model of the candidate area; and if yes, determine that the $N^{th}$ frame of image includes the target.

In some embodiments, the device further includes a control module, the control module being configured to: control the unmanned aerial vehicle to hover.

In some embodiments, the control module is further configured to control the unmanned aerial vehicle to rotate about or move along a Z axis to obtain the $N^{th}$ frame of image which is photographed after the first frame of image.

In some embodiments, the device further includes a control module, the control module being configured to: control the unmanned aerial vehicle to rotate about or move along a Z axis to obtain the $N^{th}$ frame of image which is photographed after the first frame of image.

According to a third aspect, the present invention provides an unmanned aerial vehicle, including:

a body and a processor;

the processor being configured to:

obtain an image of a target, and obtain a feature model of the target according to the image of the target;

determine whether the target is lost; and if it is determined that the target is lost:

obtain a currently photographed first frame of image;

obtain an $N^{th}$ frame of image which is photographed after the first frame of image, N being an integer greater than 0;

obtain, according to the first frame of image and the $N^{th}$ frame of image, a candidate area which possibly includes the target; and determine, according to the feature model of the target and the candidate area, whether the $N^{th}$ frame of image includes the target.

In some embodiments, the feature model of the target includes global feature information and color feature information of the target.

In some embodiments, the global feature information includes an HOG of the target.

In some embodiments, the color feature information includes a color histogram of the target.

In some embodiments, the processor is configured to:

obtain a current frame of photographed image; determine, according to the feature model of the target, whether the current frame of photographed image has an area matching the feature model; and if not, determine that the target is lost.

In some embodiments, the processor is configured to:

determine a first correlation value corresponding to each area in the current frame of photographed image;

determine the area corresponding to the largest one of the first correlation values as a related area;

obtain a feature model of the related area;

determine whether the feature model of the target is consistent with the feature model of the related area; and determine that the target is lost if the feature model of the target is inconsistent with the feature model of the related area.

In some embodiments, the processor is configured to:

obtain a color feature graph of the first frame of image;

obtain a color feature graph of the $N^{th}$ frame of image; and compare the color feature graph of the first frame of image with the color feature graph of the $N^{th}$ frame of image, and if an area having a difference which meets a preset condition exists between the color feature graph of the first frame of image and the color feature graph of the $N^{th}$ frame of image, use the area having the difference which meets the preset condition as the candidate area.

In some embodiments, the processor is configured to:

obtain a feature model of the candidate area;

determine whether the feature model of the target is consistent with the feature model of the candidate area; and if yes, determine that the $N^{th}$ frame of image includes the target.

In some embodiments, the processor is configured to: control the unmanned aerial vehicle to hover.

In some embodiments, the processor is configured to: control the unmanned aerial vehicle to rotate about or move along a Z axis to obtain the $N^{th}$ frame of image which is photographed after the first frame of image.

The target detection method provided in the present invention has a fast detection speed and high accuracy, and may achieve real-time detection.

BRIEF DESCRIPTION OF THE DRAWINGS

To describe the technical solutions in some embodiments of the present invention more clearly, the following briefly describes the accompanying drawings required for describing the embodiments. Apparently, the accompanying drawings in the following descriptions show merely some embodiments of the present invention, and a person of ordinary skill in the art may still derive other drawings from these accompanying drawings without creative efforts.

DETAILED DESCRIPTION

The following clearly and describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments in the present invention without creative efforts shall fall within the protection scope of the present disclosure.

The technical solutions of the present invention are described below in detail by using specific embodiments. It should be noted that the following specific embodiments may be combined with each other, and same or similar concepts or processes may not be described again in some embodiments.

In a target detection method provided in the present invention, after it is determined that a target is lost, a currently photographed first frame of image and an $N^{th}$ frame of image which is photographed after the first frame of image are comprehensively analyzed, to find a candidate area, and to determine the target from the candidate area, thereby improving the efficiency of target re-detection. Solutions of the present invention and beneficial effects thereof are described below with reference to detailed embodiments.

Figure 1:
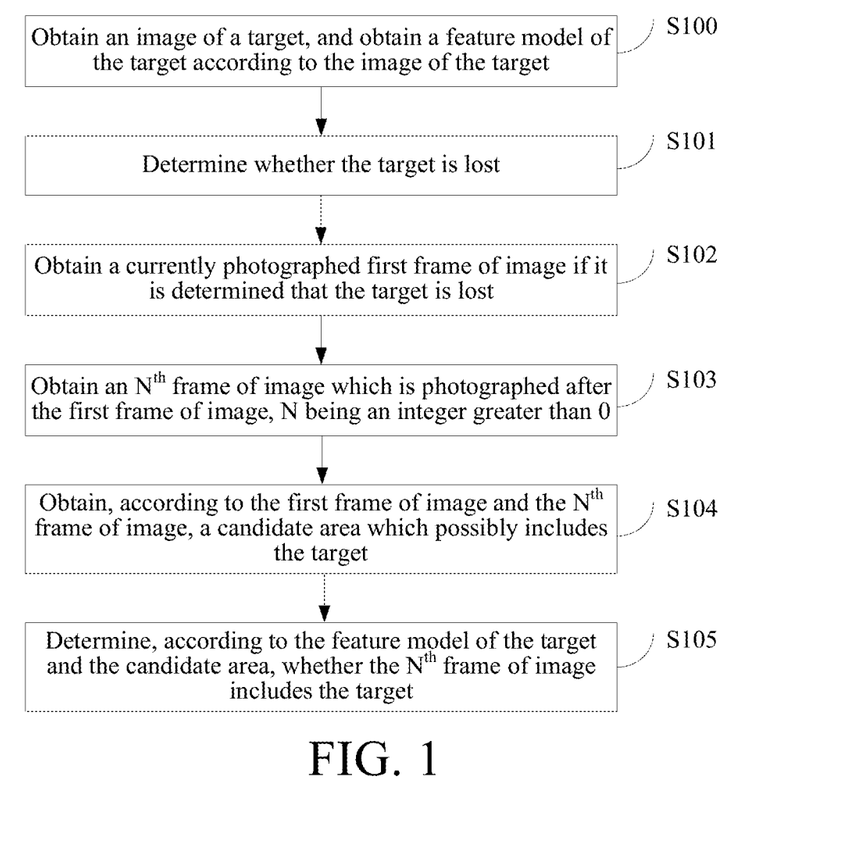
FIG. 1 is a flowchart of a target detection method according to an embodiment of the present invention.

FIG. 1 is a flowchart of a target detection method according to an embodiment of the present invention. The method may be implemented by an unmanned aerial vehicle. As shown in FIG. 1, the method may include the following steps:

S100. Obtain an image of a target, and obtain a feature model of the target according to the image of the target.

To track the target, the unmanned aerial vehicle first needs to obtain the image of the target and model the target, that is, obtain the feature model of the target, so as to track the target and re-detect the target after the target is lost. The feature model of the target may include global feature information and color feature information of the target. The global feature information includes a histogram of oriented gradient (HOG) of the target. The color feature information includes a color histogram of the target.

S101. Determine whether the target is lost.

When the unmanned aerial vehicle tracks the target, situations such as that the target is obstructed may occur. In this case, the unmanned aerial vehicle may lose the target which is being tracked. In a feasible implementation, when determining whether the target is lost, the unmanned aerial vehicle may record a currently photographed image, and then analyze the currently photographed image by using correlation filtering or another algorithm, to search a location having a maximum response in the currently photographed image, and to compare the currently photographed image with the feature model of the target which is established in step S100. It may be determined that the target is found if a difference between the currently photographed image and the feature model of the target is relatively small. Moreover, when the target is obstructed, a response value is relatively small, and the difference between the currently photographed image and the feature model of the target is relatively great. On this basis, it may be determined that the target is lost.

In an embodiment of the present invention, the unmanned aerial vehicle may obtain a current frame of photographed image; determine a first correlation value corresponding to each area in the current frame of photographed image, the first correlation value being used to reflect a similarity degree between each area and the target; determine the area corresponding to the largest one of the first correlation values as a related area; obtain a feature model of the related area, a method for obtaining the feature model may be similar to the manner of obtaining the feature model of the target in step S100; determine whether the feature model of the target is consistent with the feature model of the related area; and determine that the target is lost if the feature model of the target is inconsistent with the feature model of the related area.

S102. Obtain a currently photographed first frame of image if it is determined that the target is lost.

For example, as stated in step S101, if the response value obtained after comparing the currently photographed image with the feature model of the target is relatively small, and the difference between the currently photographed image and the feature model of the target is relatively great, the currently photographed image may be used as the first frame of image.

In addition, in a feasible implementation, before the currently photographed first frame of image is obtained, the unmanned aerial vehicle may further be controlled to hover. After determining that the target is lost, the unmanned aerial vehicle may be in a hovering state, so as to ensure consistency of a background, being able to extract a foreground more quickly.

S103. Obtain an $N^{th}$ frame of image which is photographed after the first frame of image, N being an integer greater than 0.

The $N^{th}$ frame of image which is N frames later may be obtained in a manner same to the manner, for example, photographing, of obtaining the first frame of image. Herein, N is an integer greater than 0. N may be a preset positive integer, for example, actually, may be 6 or 9. The value of N herein is only an example, and is not limited thereto.

S104. Obtain, according to the first frame of image and the $N^{th}$ frame of image, a candidate area which possibly includes the target.

After the first frame of image and the $N^{th}$ frame of image are obtained, the candidate area which possibly includes the target may be obtained.

In a feasible implementation, when searching the candidate area which possibly includes the target, the unmanned aerial vehicle may perform the following cyclical processing operations.

For example, the unmanned aerial vehicle may respectively obtain a color feature graph of the first frame of image and a color feature graph of the $N^{th}$ frame of image. The color feature graph may indicate an obtained image by using a particular type of color. For example, the color feature graph of the first frame of image may reflect a color feature of the first frame of image by using a particular type of color.

After the color feature graph of the first frame of image and the color feature graph of the $N^{th}$ frame of image are respectively obtained, the color feature graph of the first frame of image and the color feature graph of the $N^{th}$ frame of image may be compared. If an area having a difference which meets a preset condition exists between the color feature graph of the first frame of image and the color feature graph of the $N^{th}$ frame of image, the area having the difference which meets the preset condition is used as the candidate area. For example, corresponding areas of the two color feature graphs may be compared. If a difference in colors is relatively great, it may be considered that the area is the candidate area.

In this way, the first frame of image and the $N^{th}$ frame of image are compared, and an area which is obviously different may include the target, and therefore may be used as the candidate area. The method for comparing the two images is not limited herein, and any method which can determine a different area between the two images may be applied herein. Similarly, the obtaining an $N^{th}$ frame of image which is photographed after the first frame of image may include controlling the unmanned aerial vehicle to rotate about or move along a Z axis to obtain the $N^{th}$ frame of image which is photographed after the first frame of image.

S105. Determine, according to the feature model of the target and the candidate area, whether the $N^{th}$ frame of image includes the target.

After the candidate area is determined by the unmanned aerial vehicle, the target may be determined from the candidate area according to the feature model of the target. Actually, due to impact of factors such as a shooting angle or an actual geographical environment, the candidate area only possibly includes the target, but does not necessarily include the target. Therefore, after the candidate area is determined, the unmanned aerial vehicle further needs to screen the target from the candidate area.

In a feasible implementation, the unmanned aerial vehicle may obtain a feature model of the candidate area, where a method for obtaining the feature model may be similar to the method for obtaining the feature model of the target in step S100; may determine whether the feature model of the target is consistent with the feature model of the candidate area after the feature model of the candidate area is obtained; and if yes, determine that the $N^{th}$ frame of image includes the target. For example, according to the pre-determined feature model of the target (for example, the global feature information and color feature information of the target), the candidate area in which the feature model of the candidate area matches the feature model of the target may be used as the target, so as to find the target.

The re-detection method provided in this embodiment of the present invention includes: obtaining the image of the target, and obtaining the feature model of the target according to the image of the target; determining whether the target is lost; and if it is determined that the target is lost: obtaining the currently photographed first frame of image; obtaining the Nth frame of image which is photographed after the first frame of image; obtaining, according to the first frame of image and the $N^{th}$ frame of image, the candidate area which possibly includes the target; and determining, according to the feature model of the target and the candidate area, whether the $N^{th}$ frame of image includes the target. By using the method provided in this embodiment of the present invention, when the target is lost, the target may be determined by continuously and comprehensively analyzing the first frame of image and the $N^{th}$ frame of image. Because of comprehensively analyzing the first frame of image and the $N^{th}$ frame of image, the re-detection method provided in the present invention has a higher efficiency as compared with the method of analyzing each frame of image in the prior art.

Figure 2:
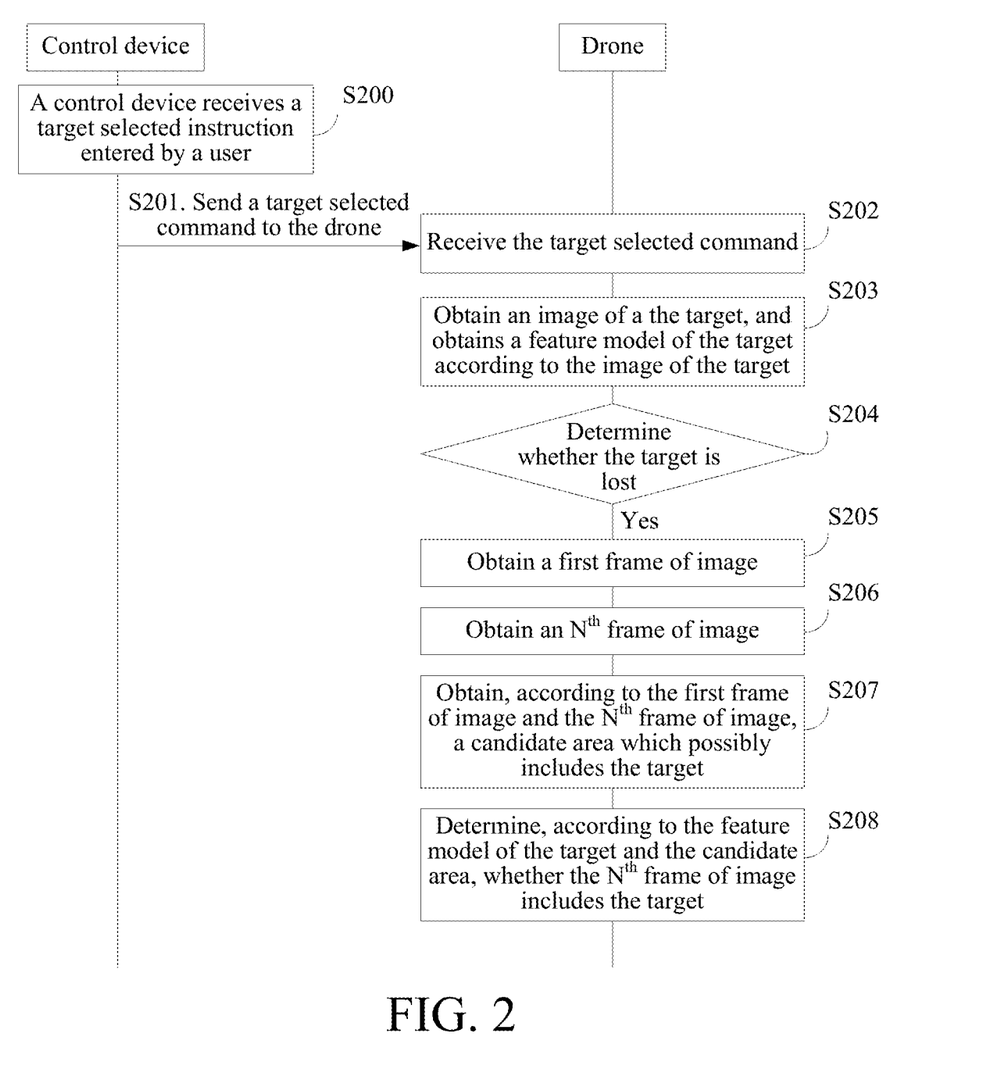
FIG. 2 is a flowchart of a target detection method according to another embodiment of the present invention.

To further describe this solution in detail, the technical solutions of the present invention are described in combination with interactions between the unmanned aerial vehicle and a control device and specific processing of the unmanned aerial vehicle for images. FIG. 2 is a flowchart of a target detection method according to another embodiment of the present invention. The method includes the following steps.

S200. A control device receives a target selected instruction entered by a user.

The control device referred in this embodiment of the present invention may be operated by the user to control the unmanned aerial vehicle. The control device may be a personal computer (PC), a tablet computer, or a terminal device. The terminal device herein may be a cellular phone, a cordless phone, a session initiation protocol (SIP) phone, a wireless local loop (WLL) station, a personal digital assistant (PDA), a handheld device having a wireless communication function, an in-vehicle device, a wearable device, a computing device, or another processing device connected to a wireless modem. For example, the user may select a target from an image presented on the control device. For example, when the control device is an electronic device having a touchscreen, the user may select, by using the touchscreen, the target which intends to be tracked by the unmanned aerial vehicle by means of box selection. In this case, the control device receives an instruction corresponding to a user entered operation. The instruction is used to instruct the target selected by the user to the control device.

S201. The control device sends a target selected command to the unmanned aerial vehicle.

After the target is determined, the control device may send an instruction command to the unmanned aerial vehicle. The instruction command may be used to instruct the unmanned aerial vehicle to track the target.

S202. The unmanned aerial vehicle receives the target selected command.

S203. The unmanned aerial vehicle obtains an image of a target, and obtains a feature model of the target according to the image of the target.

In an embodiment of the present invention, the feature model of the target may include global feature information and color feature information of the target.

The target to be tracked may be learned after the unmanned aerial vehicle receives the target selected command. To facilitate re-detecting the target again after the target is lost, the unmanned aerial vehicle may model the target, for example, obtain the feature model of the target according to the image of the target.

In this case, the unmanned aerial vehicle may analyze the target according to a preset algorithm, to obtain the global feature information and the color feature information of the target. The global feature information herein may be, for example, related information which reflects global features such as the shape and the size of the target. The color feature information may be related information which reflects a color feature of the target. In some embodiments, the global feature information may include an HOG of the target, and the color feature information may include a color histogram of the target. Descriptions are made below by using this as an example. However, it should be understood that the global feature information and the color feature information may be other information which may reflect related features of the target, and this is not limited herein.

Because the target occupies an area in the image, an HOG feature and the color histogram may be calculated according to a pixel value of each pixel in the area occupied by the target.

Figure 3:
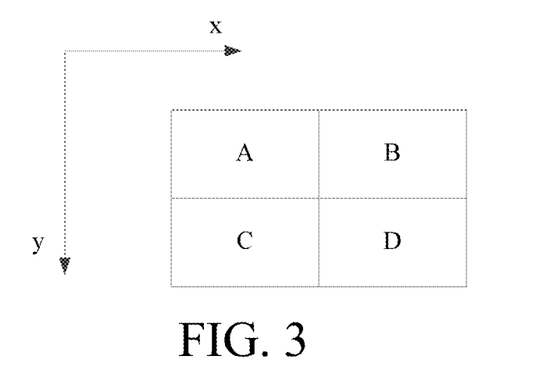
FIG. 3 is a schematic diagram of an area composed of four pixels provided in an embodiment of the present invention.

Regarding the HOG feature, using a pixel A in the area shown in FIG. 3 an example, an angle direction thereof is calculated according to the following two steps:

1) calculating gradients in an x direction and in a y direction, where the gradient in the x direction is: dx=PB-PA; and the gradient in the y direction is: dy=PA-PC, PA, PB and PC respectively indicating pixel values of pixels A, B and C; and 2) calculating the angle direction: theta=artan(dy/dx) and amplitude fA=sqrt(dx*dx+dy*dy).

Subsequently, angle directions of B, C and D are respectively calculated according to the foregoing method.

Subsequently, 360 degrees may be divided into 9 bins, and each bin covers 40 degrees. That is, 0 degree to 40 degrees fall within a first bin, 41 degrees to 80 degrees fall within a second bin, and the rest may be deduced by analogy. Corresponding bins of A, B, C and D are found according to the angle directions of A, B, C and D. The quantities of pixels fall within each pin are accumulated, so as to obtain a 9-dimensional vector. For example, if the angle directions corresponding to the four pixels A, B, C and D are 30 degrees, 35 degrees, 60 degrees and 110 degrees, the pixels A and B fall within the first bin, C fall within the second bin and D fall within a third bin. The 9-dimensional vector obtained in this case is [2,1,1,0,0,0,0,0,0].

Four neighboring areas shown in FIG. 3 are further connected, each area corresponding to a 9-dimensional vector. Therefore, a 36-dimensional HOG feature vector may be obtained by combining the 9-dimensional vectors.

Subsequently, the area occupied by the target may be divided into n (4×4) areas, and n HOG features, that is, n 36-dimensional HOG feature vectors, may be obtained; and this may be used as the global feature information of the target.

For the color histogram, the pixel value of one pixel may be respectively indicated by three components: R (Red) component, G (Green) component and B (Blue) component. That is, the pixel value of any pixel may be indicated by using the three components. In addition, each component is a gray-scale image and is indicated by a value between 0-255.

The 0-255 may be quantized by 32 bins, where each bin includes eight pixel values. For example, 0-7 fall within the first bin, 8-15 fall within a second bin, and the rest may be deduced by analogy. Therefore, three components of each pixel in the area occupied by the target may be indicated according to the foregoing groups, and then the number of R components of each pixel in each bin may be counted by using the R component as an example, so as to obtain a 32-dimensional vector. It is similar for the G component and the B component, so as to obtain a (32-dimensional×3) matrix, that is, the color histogram of the target, to serve as the color feature information of the target.

Certainly, description is made herein by using one calculation method as an example. For example, dividing the area into (4×4), dividing an angle into nine groups, and quantizing 0-255 by 32 regions are only examples, and may be flexibly changed in actual according to requirements. Alternatively, existing HOG and color histogram calculation methods may be adopted to obtain the global feature information and the color feature information of the target, and details are not described herein again.

In addition, it should be noted that in this embodiment, the control device determines the target and sends the target selected command to the unmanned aerial vehicle. The unmanned aerial vehicle models the target, that is, obtains the global feature information and the color feature information of the target. Certainly, the control device may also obtain the feature model of the target after step S200, and the obtaining method may be same as that of the unmanned aerial vehicle, so as to send the obtained global feature information and color feature information of the target to the unmanned aerial vehicle. In this way, a process in which the unmanned aerial vehicle models the target is saved.

S204. The unmanned aerial vehicle determines whether the target is lost.

The unmanned aerial vehicle may obtain a current frame of photographed image; subsequently determine, according to the feature model of the target, whether the current frame of photographed image has an area matching the feature model; and if not, determine that the target is lost.

For example, the unmanned aerial vehicle may determine a first correlation value corresponding to each area in the current frame of photographed image. The first correlation value reflects the degree of relevance between each area and the target, and a value thereof may be, for example, a real number between 0 and 1. For example, the unmanned aerial vehicle may determine the first correlation value corresponding to each area in the currently photographed image by using the correlation filtering algorithm. Herein, the process of calculating the correlation value by using the correlation filtering algorithm is same as that in the prior art, and details are not described herein again.

Subsequently, because the first correlation value reflects the degree of relevance between each area and the target, the unmanned aerial vehicle may determine the area corresponding to the largest one of the first correlation values, that is, an area which is most similar to the target, as a related area.

However, as stated above, due to impact of factors such as a shooting angle or an actual geographical environment, the related area determined in this case is not necessarily the target. Therefore, the following steps further needs to be performed: obtaining a feature model of the related area; determining whether the feature model of the target is consistent with the feature model of the related area; and determining that the target is lost if the feature model of the target is inconsistent with the feature model of the related area.

For example, the unmanned aerial vehicle may extract an HOG and a color histogram of the related area, and analyze an HOG feature of the obtained related area to determine whether the related area is consistent with the HOG feature of the target. However, analyzing the HOG feature only may result in erroneous determining, and therefore, the unmanned aerial vehicle may further analyze the color histogram of the related area. For example, the unmanned aerial vehicle may determine whether the color histogram of the related area is consistent with the color histogram of the target. If the color histogram of the related area is consistent with the color histogram of the target, the unmanned aerial vehicle may determine that the target is not lost and the related area is the target. If the color histogram of the related area is inconsistent with the color histogram of the target, the unmanned aerial vehicle may determine that the target is lost. Herein, a candidate target is further verified by using the color histogram of the target, so as to determine whether the target is lost more accurately.

If it is determined that the target is lost, a next step of the method is continued to be performed; and if it is determined that the target is not lost, processes of the method end, and the unmanned aerial vehicle continues to track the target.

S205. The unmanned aerial vehicle obtains a first frame of image.

Step S205 is similar to step S102 described in the previous embodiment, and details are not described herein again.

In other embodiments of the present invention, a step of controlling the unmanned aerial vehicle to hover may further be included before step S205. In this way, consistency of a background may be ensured, so as to extract a foreground more quickly.

S206. The unmanned aerial vehicle obtains an $N^{th}$ frame of image, N being an integer greater than 0.

Step S206 is similar to step S103 described in the previous embodiment, and details are not described herein again.

S207. The unmanned aerial vehicle obtains, according to the first frame of image and the $N^{th}$ frame of image, a candidate area which possibly includes the target.

In an embodiment of the present invention, the unmanned aerial vehicle may determine whether the candidate area exists according to the following three steps.

1) The unmanned aerial vehicle obtains a color feature graph of the first frame of image.

The unmanned aerial vehicle may record the first frame of image, and quantize a pixel value of each pixel in the first frame of image by using a preset pixel region corresponding to a preset type of color, to obtain a first feature image. The first feature image indicates the color feature graph of the first frame of image, the color feature graph indicating the first frame of image by using the preset type of color.

2) The unmanned aerial vehicle obtains a color feature graph of the $N^{th}$ frame of image.

The unmanned aerial vehicle may record the $N^{th}$ frame of image, and quantize a pixel value of each pixel in the $N^{th}$ frame of image by using a preset pixel region corresponding to a preset type of color, to obtain a second feature image. The second feature image indicates the color feature graph of the $N^{th}$ frame of image, the color feature graph indicating the $N^{th}$ frame of image by using the preset type of color.

Using a color image (a color name) as an example, the foregoing two steps are aimed at indicating an image recorded by the unmanned aerial vehicle by using a feature image. For example, a color name image may indicate the image by using 11 particular colors. The 11 colors respectively are: black, blue, brown, grey, green, orange, pink, purple, red, white and yellow. Each color is indicated by corresponding R, G and B components. Using red as an example, the corresponding R, G and B are R=255, G=0 and B=0. For green, the corresponding R, G and B are R=0, G=255 and B=0. Because the 11 colors are required herein to quantize the first frame of image, a pixel region may be set for each preset color. For example, although red corresponds to R=255, G=0 and B=0, the pixel region may be preset to be R=[240-255], G=[0-10] and B=[0-10]. That is, all pixels of which the R, G and B components fall within the foregoing preset pixel region may correspond to the red in the 11 preset colors.

The pixel value of each pixel in the first frame of image may be indicated by using the R, G and B components. Therefore, correspondence may be made between each pixel and a corresponding color in the 11 preset colors according to the pixel value of each pixel in the first frame of image. In this way, the first feature image may be obtained. That is, the first frame of image is indicated by using the 11 colors. Seeing from an intuitive view, an original first frame of image may be an image which includes various colors. However, the first frame of image includes the foregoing 11 colors at most after being quantized.

Similar processing may be made to the $N^{th}$ frame of image to obtain the second feature image.

3) The color feature graph of the first frame of image and the color feature graph of the $N^{th}$ frame of image are compared. If an area having a difference which meets a preset condition exists between the color feature graph of the first frame of image and the color feature graph of the $N^{th}$ frame of image, the area having the difference which meets the preset condition is used as the candidate area.

For example, the unmanned aerial vehicle may compare the first feature image with the second feature image. If an area having a difference which meets the preset condition does not exist between the first feature image and the second feature image, the unmanned aerial vehicle determines that the candidate area does not exist. Otherwise, the unmanned aerial vehicle determines to use the area having the difference which meets the preset condition as the candidate area.

For this step, still using the color name image as an example, the unmanned aerial vehicle may respectively number the 11 colors. For example, the 11 colors are respectively numbered as 1-11, the black corresponding to 1 and blue corresponding to 2. The 11 colors are successively and cumulatively numbered in the foregoing order of the 11 colors. Certainly, specific number values are not limited herein, provided that the numbers are in one-to-one correspondence to the colors.

Subsequently, the unmanned aerial vehicle may mark the first feature image and the second feature image according to the numbers. Because the first feature image and the second feature image both are images indicated by using the foregoing 11 color, according to numbers corresponding to the 11 colors, the number is recorded at the corresponding color as the mark.

Subsequently, the unmanned aerial vehicle may make a frame difference, that is, subtract the marks at corresponding locations of the first feature image and the second feature image. For example, at a same location, the mark of the first feature image is 2 and the mark in the second feature image is also 2. Therefore, in this case, a difference between the marks at the corresponding location is 0, reflecting that two images at the location are the same. However, if there is another location, the mark of the first feature image is 2 and the mark in the second feature image is 8. In this case, a difference between the marks at the corresponding location is 6. Therefore, the difference 6 may be compared with a preset first preset threshold. The first preset threshold may be preset. For example, if the first preset threshold is 3, it indicates that the location in a current frame is obviously different from that in an $N^{th}$ frame. This may be because that the target is no longer obstructed. Therefore, in this case, the location may be recorded. Operations are made in this way until differences are made for marks at all corresponding locations on the two feature images. If all the differences are smaller than the first preset threshold, the unmanned aerial vehicle determines that the candidate area does not exist. That is, the two images do not have areas which have an expected difference;

otherwise, the unmanned aerial vehicle may use an area composed of corresponding locations of which the differences are not smaller than the first preset threshold as the candidate area. That is, the unmanned aerial vehicle may connect the corresponding locations of which the differences are not smaller than the first preset threshold, that is, locations varying obviously, to compose the candidate area.

Figure 4:
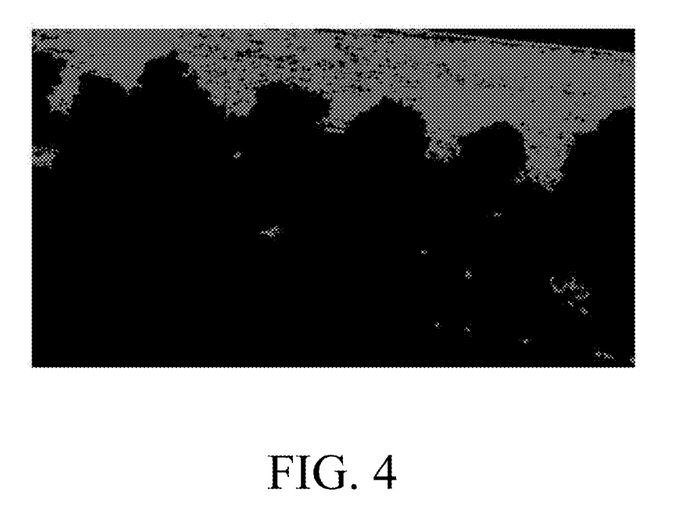
FIG. 4 is a first feature image provided in an embodiment of the present invention.
Figure 5:
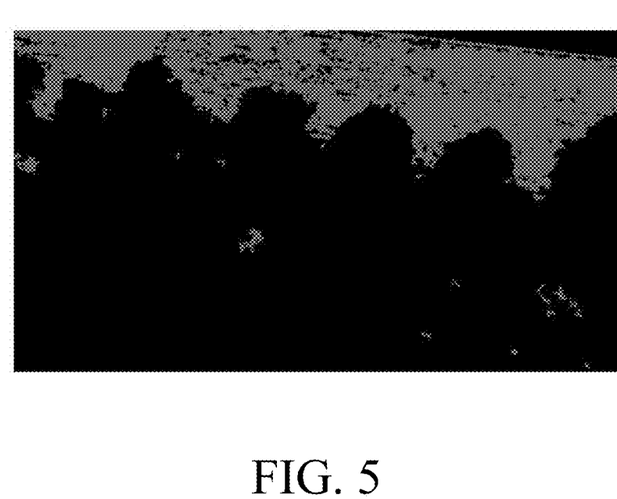
FIG. 5 is a second feature image provided in an embodiment of the present invention.
Figure 6:
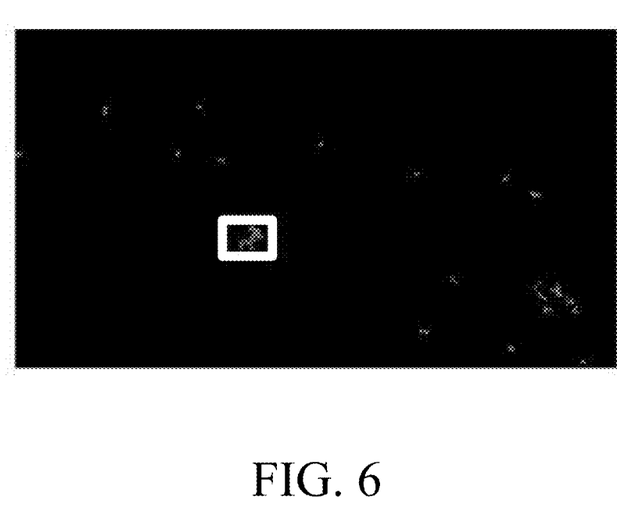
FIG. 6 is a comparison result of the first feature image and the second feature image which are provided in the embodiments of the present invention.

FIG. 4 and FIG. 5 respectively show examples of the first feature image and the second feature image. FIG. 6 is an image after differences between the feature images in FIG. 4 and FIG. 5 are made. It may be seen that what identified in a white square frame is the target.

S208. The unmanned aerial vehicle determines, according to the feature model of the target and the candidate area, whether the $N^{th}$ frame of image includes the target.

The unmanned aerial vehicle may obtain a feature model of the candidate area; determine whether the feature model of the target is consistent with the feature model of the candidate area; and if yes, determine that the $N^{th}$ frame of image includes the target.

For example, the unmanned aerial vehicle may obtain an HOG feature and a color histogram of the candidate area. The process of obtaining the HOG feature and the color histogram of the candidate area herein may be same as the process of obtaining the HOG feature and the color histogram of the target in step S203, and details are not described herein again. If there are a plurality of candidate areas, HOG features and color histograms of all candidate area are respectively obtained.

Subsequently, the unmanned aerial vehicle may compare the HOG feature and the color histogram of the candidate area with the HOG feature and the color histogram of the target. If the HOG feature and the color histogram of the candidate area are consistent with the HOG feature and the color histogram of the target, it is determined that the $N^{th}$ frame of image includes the target.

In some embodiments, because the target is re-detected, a target obtained by the re-detection may be changed. Therefore, the unmanned aerial vehicle may use the target obtained by the re-detection as a new target to track and obtain the feature model of the target again as described in step S203, so as to better track the target.

By using the method provided in the embodiments of the present invention, when the target is lost, the target may be determined by continuously and comprehensively analyzing the first frame of image and the $N^{th}$ frame of image. Because the first frame of image and the $N^{th}$ frame of image are comprehensively analyzed and are respectively quantized as the first feature image and the second feature image, a difference between the images may be obtained by a simple subtraction when the first frame of image and the $N^{th}$ frame of image are compared. Therefore, the re-detection method provided in the present invention has a higher efficiency as compared with the method of analyzing each frame of image in the prior art.

Figure 7:
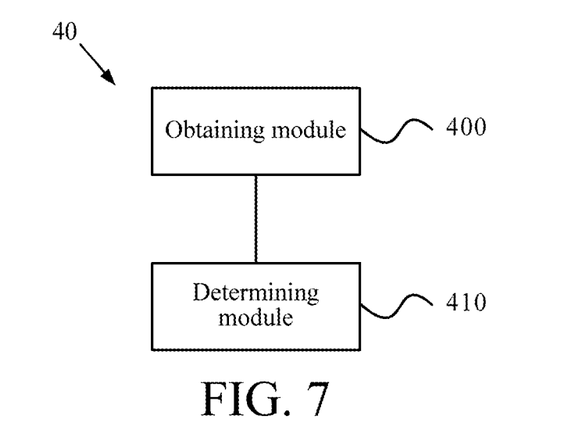
FIG. 7 is a schematic structural diagram of a target detection device according to an embodiment of the present invention.

FIG. 7 is a schematic structural diagram of a target detection device according to an embodiment of the present invention. As shown in FIG. 7, a target detection device 40 is applied to an unmanned aerial vehicle and includes an obtaining module 400 and a determining module 410.

The obtaining module 400 is configured to obtain an image of a target, and obtain a feature model of the target according to the image of the target.

The determining module 410 is configured to determine whether the target is lost.

The obtaining module 400 is further configured to, if it is determined that the target is lost, obtain a currently photographed first frame of image; obtain an $N^{th}$ frame of image which is photographed after the first frame of image, N being an integer greater than 0; and obtain, according to the first frame of image and the $N^{th}$ frame of image, a candidate area which possibly includes the target.

The determining module 410 is further configured to determine, according to the feature model of the target and the candidate area, whether the $N^{th}$ frame of image includes the target.

In some embodiments, the feature model of the target includes global feature information and color feature information of the target.

In some embodiments, the global feature information includes an HOG of the target.

In some embodiments, the color feature information includes a color histogram of the target.

In some embodiments, the determining module 410 is specifically configured to: obtain a current frame of photographed image; determine, according to the feature model of the target, whether the current frame of photographed image has an area matching the feature model; and if not, determine that the target is lost.

In some embodiments, the determining module 410 is specifically configured to: determine a first correlation value corresponding to each area in the current frame of photographed image; determine the area corresponding to the largest one of the first correlation values as a related area; obtain a feature model of the related area; determine whether the feature model of the target is consistent with the feature model of the related area; and determine that the target is lost if the feature model of the target is inconsistent with the feature model of the related area.

In some embodiments, the obtaining module 400 is specifically configured to: obtain a color feature graph of the first frame of image; obtain a color feature graph of the $N^{th}$ frame of image; and compare the color feature graph of the first frame of image with the color feature graph of the $N^{th}$ frame of image, and if an area having a difference which meets a preset condition exists between the color feature graph of the first frame of image and the color feature graph of the $N^{th}$ frame of image, use the area having the difference which meets the preset condition as the candidate area.

In some embodiments, the determining module 410 is specifically configured to: obtain a feature model of the candidate area; determine whether the feature model of the target is consistent with the feature model of the candidate area; and if yes, determine that the $N^{th}$ frame of image includes the target.

By using the device provided in the embodiments of the present invention, when the target is lost, the target may be determined by continuously and comprehensively analyzing the first frame of image and the $N^{th}$ frame of image. Because the first frame of image and the $N^{th}$ frame of image are comprehensively analyzed and are respectively quantized as a first feature image and a second feature image, a difference between the images may be obtained by a simple subtraction when the first frame of image and the $N^{th}$ frame of image are compared. Therefore, the re-detection method provided in the present invention has a higher efficiency as compared with the method of analyzing each frame of image in the prior art.

Figure 8:
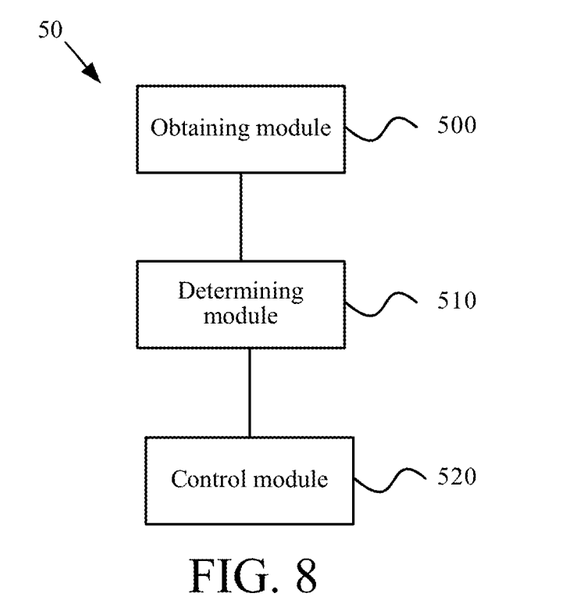
FIG. 8 is a schematic structural diagram of a target detection device according to an embodiment of the present invention.

FIG. 8 is a schematic structural diagram of a target detection device according to an embodiment of the present invention. As shown in FIG. 8, a target detection device 50 is applied to an unmanned aerial vehicle and includes an obtaining module 500, a determining module 510 and a control module 520. The obtaining module 500 and the determining module 510 are respectively similar to the obtaining module 400 and the determining module 410 shown in FIG. 7, and details are not described herein again.

The control module 520 is configured to control the unmanned aerial vehicle to hover.

In some embodiments, the control module 520 is further configured to control the unmanned aerial vehicle to rotate or move along a Z axis to obtain an $N^{th}$ frame of image which is photographed after a first frame of image.

By using the device provided in the embodiments of the present invention, when the target is lost, the target may be determined by continuously and comprehensively analyzing the first frame of image and the $N^{th}$ frame of image. Because the first frame of image and the $N^{th}$ frame of image are comprehensively analyzed and are respectively quantized as a first feature image and a second feature image, a difference between the images may be obtained by a simple subtraction when the first frame of image and the $N^{th}$ frame of image are compared. Therefore, the re-detection method provided in the present invention has a higher efficiency as compared with the method of analyzing each frame of image in the prior art.

Figure 9:
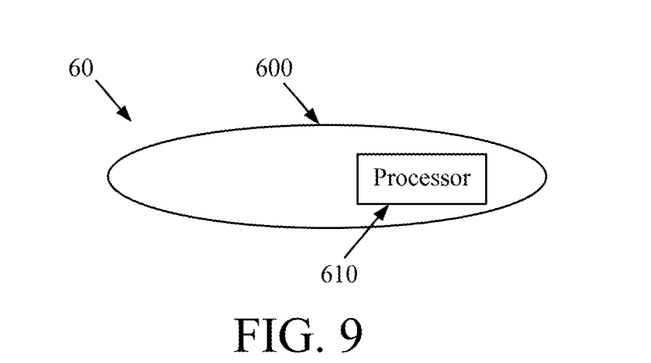
FIG. 9 is a schematic structural diagram of an unmanned aerial vehicle according to an embodiment of the present invention.

FIG. 9 is a schematic structural diagram of an unmanned aerial vehicle according to an embodiment of the present invention. As shown in FIG. 9, the unmanned aerial vehicle 60 includes a body 600 and a processor 610.

The processor 610 is configured to: obtain an image of a target, and obtain a feature model of the target according to the image of the target; determine whether the target is lost; and if it is determined that the target is lost: obtain a currently photographed first frame of image; obtain an $N^{th}$ frame of image which is photographed after the first frame of image, N being an integer greater than 0; obtain, according to the first frame of image and the $N^{th}$ frame of image, a candidate area which possibly includes the target; and determine, according to the feature model of the target and the candidate area, whether the $N^{th}$ frame of image includes the target.

In some embodiments, the feature model of the target includes global feature information and color feature information of the target.

In some embodiments, the global feature information includes an HOG of the target.

In some embodiments, the color feature information includes a color histogram of the target.

In some embodiments, the processor 610 is configured to: obtain a current frame of photographed image; determine, according to the feature model of the target, whether the current frame of photographed image has an area matching the feature model; and if not, determine that the target is lost.

In some embodiments, the processor 610 is configured to: determine a first correlation value corresponding to each area in the current frame of photographed image; determine the area corresponding to the largest one of the first correlation values as a related area; obtain a feature model of the related area; determine whether the feature model of the target is consistent with the feature model of the related area; and determine that the target is lost if the feature model of the target is inconsistent with the feature model of the related area.

In some embodiments, the processor 610 is configured to: obtain a color feature graph of the first frame of image; obtain a color feature graph of the $N^{th}$ frame of image; and compare the color feature graph of the first frame of image with the color feature graph of the $N^{th}$ frame of image, and if an area having a difference which meets a preset condition exists between the color feature graph of the first frame of image and the color feature graph of the $N^{th}$ frame of image, use the area having the difference which meets the preset condition as the candidate area.

In some embodiments, the processor 610 is configured to: obtain a feature model of the candidate area; determine whether the feature model of the target is consistent with the feature model of the candidate area; and if yes, determine that the $N^{th}$ frame of image includes the target.

In some embodiments, the processor 610 is configured to: control the unmanned aerial vehicle to hover.

In some embodiments, the processor 610 is configured to: control the unmanned aerial vehicle to rotate about or move along a Z axis to obtain the $N^{th}$ frame of image which is photographed after the first frame of image.

By using the unmanned aerial vehicle provided in the embodiments of the present invention, when the target is lost, the target may be determined by continuously and comprehensively analyzing the first frame of image and the $N^{th}$ frame of image. Because the first frame of image and the $N^{th}$ frame of image are comprehensively analyzed and are respectively quantized as a first feature image and a second feature image, a difference between the images may be obtained by a simple subtraction when the first frame of image and the $N^{th}$ frame of image are compared. Therefore, the re-detection method provided in the present invention has a higher efficiency as compared with the method of analyzing each frame of image in the prior art.

The objectives, technical solutions and beneficial effects of the present invention are further described in detail in the foregoing embodiments. It should be understood that the foregoing descriptions are merely specific implementations of the present invention, but are not intended to limit the protection scope of present invention. Any modification, equivalent replacement or improvement made without departing from the spirit and principle of the present invention should fall within the protection scope of the present invention.

What is claimed is:

1. A target detection method, applied to an unmanned aerial vehicle, comprising:
   obtaining an image of a target, and obtaining a feature model of the target according to the image of the target;
   determining whether the target is lost; and
   if it is determined that the target is lost:
   obtaining a currently photographed first frame of the image;
   obtaining an $N^{th}$ frame of the image which is photographed after the first frame of the image, N being an integer greater than 0;
   obtaining, according to the first frame of the image and the $N^{th}$ frame of the image, a candidate area which possibly comprises the target; and
   determining, according to the feature model of the target and the candidate area, whether the $N^{th}$ frame of the image comprises the target;
   wherein the feature model of the target comprises global feature information and color feature information of the target;
   wherein the global feature information comprises a histogram of oriented gradient (HOG) of the target;
   wherein the color feature information comprises a color histogram of the target;

wherein the HOG and the color histogram are calculated according to a pixel value of each pixel in the candidate area occupied by the target, wherein the obtaining the Nth frame of the image which is photographed after the first frame of the image comprises:
controlling the unmanned aerial vehicle to rotate about or move along a Z axis to obtain the Nth frame of the image which is photographed after the first frame of the image.

2. The method according to claim 1, wherein the determining whether the target is lost comprises:
obtaining a current frame of the image;
determining, according to the feature model of the target, whether the current frame of the image has an area matching the feature model; and
if not, determining that the target is lost.

3. The method according to claim 2, wherein the determining, according to the feature model of the target, whether the image has the area matching the feature model comprises:
determining a first correlation value corresponding to each area in the current frame of the image;
determining the area corresponding to largest one of the first correlation values as a related area;
obtaining a feature model of the related area;
determining whether the feature model of the target is consistent with the feature model of the related area; and
determining that the target is lost if the feature model of the target is inconsistent with the feature model of the related area.

4. The method according to claim 1, wherein the obtaining, according to the first frame of the image and the $N^{th}$ frame of the image, the candidate area which possibly comprises the target comprises:
obtaining a color feature graph of the first frame of the image;
obtaining a color feature graph of the $N^{th}$ frame of the image; and
comparing the color feature graph of the first frame of the image with the color feature graph of the $N^{th}$ frame of the image, and if an area having a difference which meets a preset condition exists between the color feature graph of the first frame of the image and the color feature graph of the $N^{th}$ frame of the image, using the area having the difference which meets the preset condition as the candidate area.

5. The method according to claim 1, wherein the determining, according to the feature model of the target and the candidate area, whether the $N^{th}$ frame of the image comprises the target comprises:
obtaining a feature model of the candidate area;
determining whether the feature model of the target is consistent with the feature model of the candidate area; and
if yes, determining that the $N^{th}$ frame of the image comprises the target.

6. The method according to claim 1, wherein the method further comprises:
controlling the unmanned aerial vehicle to hover before the obtaining a currently photographed first frame of the image.

7. An unmanned aerial vehicle, comprising:
a body and a processor;
the processor being configured to:
obtain an image of a target, and obtain a feature model of the target according to the image of the target;
determine whether the target is lost; and
if it is determined that the target is lost:
obtain a currently photographed first frame of the image;
obtain an $N^{th}$ frame of the image which is photographed after the first frame of the image, N being an integer greater than 0;
obtain, according to the first frame of the image and the $N^{th}$ frame of the image, a candidate area which possibly comprises the target; and
determine, according to the feature model of the target and the candidate area, whether the $N^{th}$ frame of the image comprises the target;
wherein the feature model of the target comprises global feature information and color feature information of the target;
wherein the global feature information comprises a histogram of oriented gradient (HOG) of the target;
wherein the color feature information comprises a color histogram of the target;
wherein the HOG and the color histogram are calculated according to a pixel value of each pixel in the candidate area occupied by the target, wherein the processor is configured to:
control the unmanned aerial vehicle to rotate about or move along a Z axis to obtain the Nth frame of the image which is photographed after the first frame of the image.

8. The unmanned aerial vehicle according to claim 7, wherein the processor is configured to:
obtain a current frame of the image;
determine, according to the feature model of the target, whether the current frame of the image has an area matching the feature model; and
if not, determine that the target is lost.

9. The unmanned aerial vehicle according to claim 8, wherein the processor is configured to:
determine a first correlation value corresponding to each area in the current frame of the image;
determine the area corresponding to largest one of the first correlation values as a related area;
obtain a feature model of the related area;
determine whether the feature model of the target is consistent with the feature model of the related area; and
determine that the target is lost if the feature model of the target is inconsistent with the feature model of the related area.

10. The unmanned aerial vehicle according to claim 7, wherein the processor is configured to:
obtain a color feature graph of the first frame of the image;
obtain a color feature graph of the $N^{th}$ frame of the image; and
compare the color feature graph of the first frame of the image with the color feature graph of the $N^{th}$ frame of the image, and if an area having a difference which meets a preset condition exists between the color feature graph of the first frame of the image and the color feature graph of the $N^{th}$ frame of the image, use the area having the difference which meets the preset condition as the candidate area.

11. The unmanned aerial vehicle according to claim 7, wherein the processor is configured to:
obtain a feature model of the candidate area;
determine whether the feature model of the target is consistent with the feature model of the candidate area; and if yes, determine that the $N^{th}$ frame of the image comprises the target.

12. The unmanned aerial vehicle according to claim 7, wherein the processor is configured to:
   control the unmanned aerial vehicle to hover.

* * * * *